United States Patent [19]

Gelardi et al.

[11] Patent Number: 5,054,616
[45] Date of Patent: Oct. 8, 1991

[54] REMOVABLE WINDOWS FOR VIDEO TAPE CASSETTE AND RELATED METHODS OF ASSEMBLY

[75] Inventors: Anthony Gelardi, Cape Porpoise; Craig Lovecky, Old Orchard Beach, both of Me.; Alan Lowry, Canton, Mass.

[73] Assignee: Shape, Inc., Biddeford, Me.

[21] Appl. No.: 471,325

[22] Filed: Jan. 29, 1990

[51] Int. Cl.⁵ ............................................. B65D 85/672
[52] U.S. Cl. .................................. 206/393; 206/459; 220/662; 242/200
[58] Field of Search ............ 206/45.31, 45.34, 387, 206/389, 459, 393; 220/662–665; 242/198–200

[56] References Cited

U.S. PATENT DOCUMENTS

| | | |
|---|---|---|
| D. 279,762 | 7/1985 | Yoshizawa . |
| D. 282,444 | 2/1986 | Yoshizawa . |
| D. 282,445 | 2/1986 | Yoshizawa . |
| D. 283,458 | 4/1986 | Yoshizawa . |
| D. 287,007 | 12/1986 | Wada et al. . |
| D. 289,519 | 4/1987 | Ohya et al. . |
| D. 289,637 | 5/1987 | Ohya et al. . |
| D. 291,799 | 9/1987 | Marshall et al. . |
| 3,401,269 | 9/1968 | Tabet .................................. 220/663 |
| 3,704,841 | 12/1972 | Brown ................................. 242/199 |
| 4,320,831 | 3/1982 | Szabo et al. ...................... 206/45.34 |
| 4,368,860 | 1/1983 | Goto . |
| 4,452,408 | 6/1984 | Sasaki ................................. 242/199 |
| 4,485,989 | 12/1984 | Ogiro et al. . |
| 4,501,396 | 2/1985 | Tomsyck et al. .................. 242/199 |
| 4,530,475 | 7/1985 | Buerkle et al. . |
| 4,553,717 | 11/1985 | Takagi . |
| 4,629,144 | 12/1986 | Schoettle . |
| 4,707,757 | 11/1987 | Shiba et al. . |
| 4,717,091 | 1/1988 | Schoettle et al. . |
| 4,770,367 | 9/1988 | Carroll . |
| 4,773,614 | 9/1988 | Makino et al. ..................... 242/199 |
| 4,802,044 | 1/1989 | Iwahashi et al. . |
| 4,816,953 | 3/1989 | Ohyama et al. . |
| 4,911,298 | 3/1990 | Miyagawa et al. ................ 206/387 |

FOREIGN PATENT DOCUMENTS

| | | | |
|---|---|---|---|
| 0152693 | 8/1985 | European Pat. Off. .......... 242/199 |
| 0133313 | 8/1982 | Japan ................................. 220/664 |
| 2248614 | 10/1987 | Japan ................................. 206/387 |

*Primary Examiner*—Jimmy G. Foster
*Attorney, Agent, or Firm*—Staas & Halsey

[57] ABSTRACT

Window/cassette cover combinations and more economical methods for assembling the window in the cassette are described. A planar window is: rectangular and includes a pair upper lips, each an opposite sides, and a pair of lower riges or ledges, each on other sides; generally square and includes an upper discontinuous lip and a pair of lower ridges or ledges on opposite sides; or circular and includes an upper continuous lip and a lower continuous ridge or ledge. In each of these three embodiments, the upper lips and lower ledges or ridges cooperate to receive the borders of a window opening formed in the cassette cover, and a label can be applied between the windows and optionally covering one or more windows. In each embodiment of the method, the window is flexed to position opposing ledges under the borders and the window is returned to its original planar position so that the upper lip abuts the top of the border. For each method, a label can be applied between the windows and covering one or more windows, and the above steps are reversed to remove the window.

9 Claims, 4 Drawing Sheets

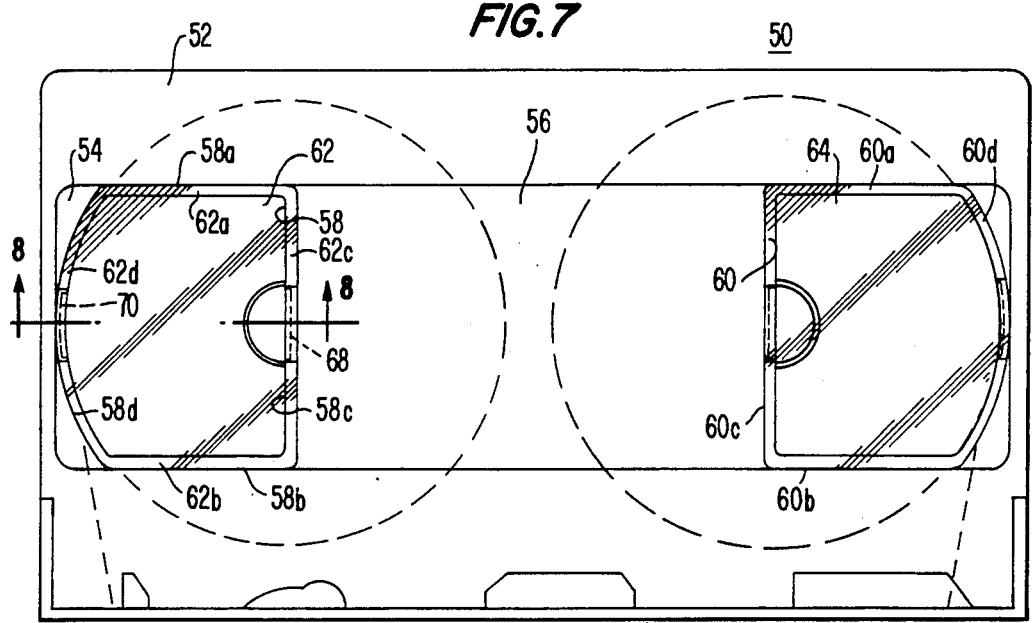
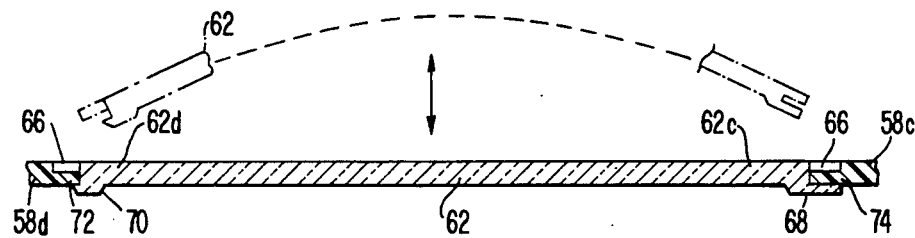
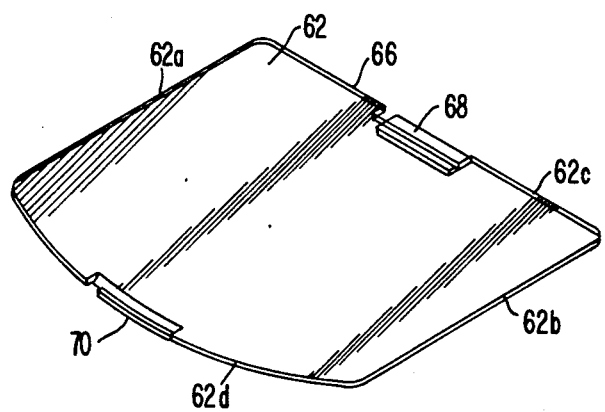

REMOVABLE WINDOWS FOR VIDEO TAPE CASSETTE AND RELATED METHODS OF ASSEMBLY

BACKGROUND OF THE INVENTION

This invention relates to tape cassettes and, more particularly, to windows for a video tape cassette cover which are easily installed and removed, and related methods of assembly and removal A conventional video tape cassette has a relatively flat, substantially rectangular configuration, formed of a suitable plastic. The cassette includes a planar base and cover, each having side walls. Tape reels are located in side-by-side relation within the cassette so as to be freely rotatable, and magnetic tape is would on the tape reels.

The cover usually includes two "windows", one on each side of a central panel which receives advertising, notices, etc. The central panel is planer and usually below the plane of the windows. The windows serve the purpose of allowing the user to see how much tape is wound on the respective reels.

In this field, the window usually includes a continuous, lower, reduced thickness lip which is received under a border of a corresponding window opening in the cover. That is, during assembly, and before the cover is mated with the base, the window is inserted from within the cover. Once the lower lip of the window and the border are abutted, the window lip is welded to the border.

The drawbacks associated with this structure and method are as follows.

Generally, the windows are needed to allow the user to see the tape. In certain circumstances, however, there is no need to see the tape, e.g. in promotional videos sent to prospective purchasers of automobiles. In such a case the prospective purchaser usually views the tape only once or twice, so repeated viewing of the tape to tell if rewinding is necessary is not a real problem. Therefore, it might be desirable to cover one or both of the windows by the label. In this way, tape cassettes for repeat viewing and "one-time" viewing could be produced from the same mold and windows could be used for both, but the window areas can also become valuable advertising space, for the one-time users. However, with the conventional designs, the windows and label areas are not co-planar so applying a label would appear unsightly and the label might interfere with proper insertion/removal relative to the tape player/recorder.

Further, during assembly, care must be taken to mount the window so that the lower lip is properly positioned at the window opening border. After positioning of the window in the cover, but before welding, the window lower lip may dislocate relative to the border while moving in the assembly line. Further, since the lower lip must be welded to hold the window in place, a relatively expensive welder is required which must be adjusted, as different plastic materials are used. All of these steps, of course, factor in the cost of the video tape cassette.

Further, if a defect is found in either the window or cover the window cannot be removed without damaging the window and/or cover. These parts could not be re-used, but would have to be scrapped, which increases overall production and energy costs.

Finally, with cassettes, as with all plastic consumer goods, a need exists to find ways to re-cycle the products instead of merely depositing them in land fills. Someday it may be necessary to return pre-recorded video cassettes to be reloaded with new tape, but re-using as much of the original cassette as possible, just as glass or plastic beverage bottles are currently returned and refilled. If a tape were to be returned with cracked or skuffed windows, they could not be easily removed and replaced. Again, scrapping would have to be used.

It is believed that the Phillips Company produced a video cassette some time ago which was not adopted to any commercially significant extent. The cassette included a single central window having a continuous upper lip and a plurality of lateral lower projections. The window opening border included a plurality of elongated holes effectively forming ribs or bars which were deformed by the plurality of projections when the window was pushed down in a direction perpendicular to the plane of the cassette cover. Unfortunately, this design required extensive molding considerations and it is not very easy to remove the window, once installed. Further, since the windows and a label area therearound were not co-planar, there was no possibility for using a label to cover the window, if desired.

As can be seen, the prior art discussed above still does not include the most cost-efficient window and cassette cover combination, one which lends itself to easy assembly, disassembly and reuse, or related methods of assembly and disassembly having the fewest steps.

SUMMARY OF THE INVENTION

Accordingly, it is a purpose of the present invention to provide a window/cassette cover combination which contributes to reducing overall production costs of a video tape cassette.

It is another purpose of the present invention to provide a window/cassette cover combination which is more ecological than conventional combinations because the parts thereof can be reused.

It is another object of the present invention to provide a tape cassette which includes windows which, if desired, could be easily covered by a label.

It is another purpose of the present invention to provide methods for assembling and removing a window in a video tape cassette cover which include fewer steps and lead to lower cassette production costs.

Finally, it is an object of the present invention to provide a method for assembling a window in a video tape cassette cover which is capable of facilitated manual or automated assembly.

To achieve the foregoing and other objects of the present invention and in accordance with the purposes of the invention, there is provided the following improved window/cassette cover combination and more economical methods for assembling and disassembling the window relative to the cassette.

In one embodiment, the window is rectangular and includes a pair of upper lips, each on opposite sides of the window and a pair of lower ledges or ridges, each on other opposite sides of the window. In another embodiment the window is somewhat square and includes an upper lip extending around most of the four sides, and a pair of lower ridges or ledges on two opposite sides of the window. In another embodiment, the window is circular and includes an upper continuous lip and a lower continuous ledge. In each of these three embodiments, the upper lips and lower ledges cooperate to receive the borders of the window opening therebetween to hold the window in place. Further, a label can be applied between the windows, or covering one or both of the windows.

In a corresponding first embodiment of the method for assembly, the rectangular window is flexed to position the opposing ledges under opposing edges of the border and the window is returned to its original planar position so that the upper lips abut other opposite sides of the border. In a second corresponding embodiment of the method, the circular window is flexed so that the lower ledge engages below the border and the border is held between the upper lip and the lower ledge. In a third embodiment of the method, the "square" window is flexed such that lower ledges fit under opposite edges of the border and the upper lips abut the top of other opposite sides of the border when the window returns to its planar position. For each method, a label can be applied between the windows, or covering one or both windows. The above steps are merely reversed to remove a window.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a top view of a video tape cassette according to a second embodiment of the present invention, illustrating the windows removably assembled in the cassette cover;

FIG. 8 is a side, cross-sectional view illustrating a window removably assembled in the cassette cover, taken along line 8—8 of FIG. 7, and the insertion/removal of the window in phantom lines;

FIG. 9 is a perspective view of a window according to the second embodiment of the present invention;

DETAILED DESCRIPTION OF THE PREFERRED EMBODIMENTS

Preferred embodiments of the present invention will now be described with reference to FIGS. 1-11.

Figure 1:
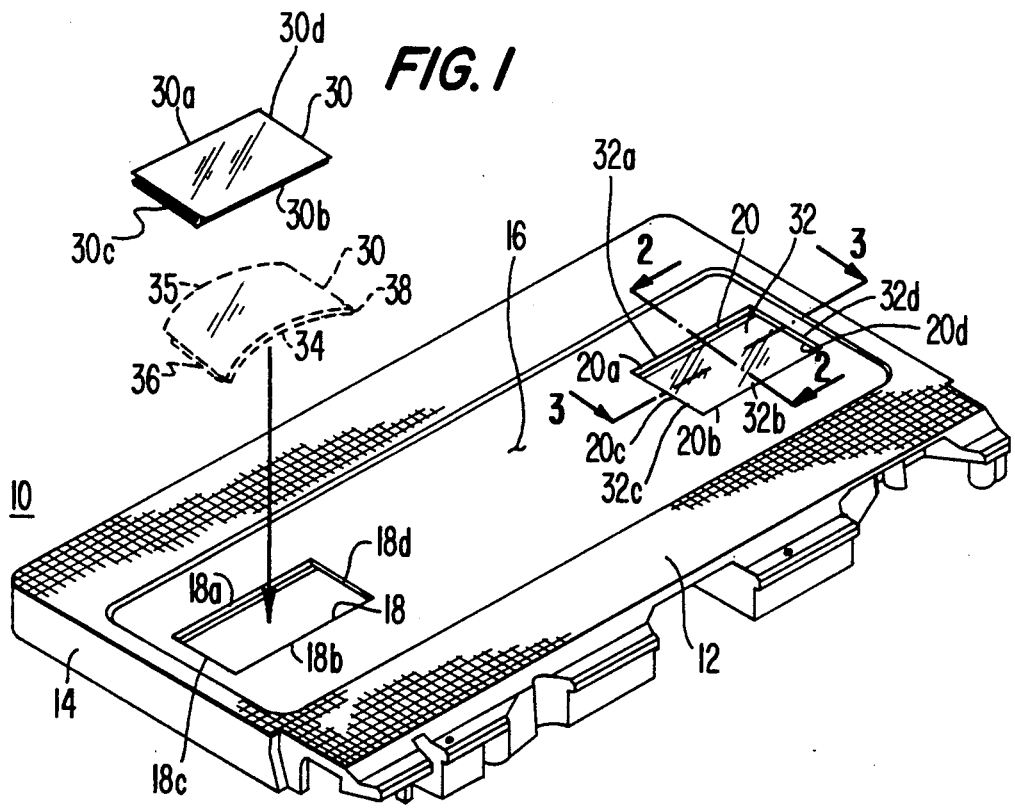
FIG. 1 is a perspective view of a video tape cassette according to a first embodiment of the present invention.

FIG. 1 is a top view of the video tape cassette cover according to a first embodiment the present invention. The cassette cover is generally denominated by reference numeral 10 and includes a planar area 12 and side walls 14. The planar area 12 includes a recessed central panel or label area 16 which receives advertising, notices, etc. Laterally of the central panel 16 there is formed a pair of rectangular window openings 18 and 20, respectively, the upper portions of which are co-planar with the central panel 16. The window openings 18 and 20 include two opposite sides 18a, 18b and 20a, 20b, and two opposite shorter sides 18c, 18d, 20c, 20d, respectively.

A window 30 is shown ready to be installed in window opening 18. Already located within the window opening 20 is a window 32. Because the configuration of each of the windows 30 and 32 is identical, a single window 32 will be described more fully hereafter.

Window 32 is substantially rectangular having opposing edges 32a, 32b (longer), and 32c, 32d (shorter). Upper lips 35, 34 extend along edges 32a, and 32b, respectively. A lower ledge or ridge 36 is formed along edge 32c and a lower ledge or ridge 38 is formed along edge 32d.

The window 32 is preferably molded of a forgiving clear material (e.g. polypropylene) that can flex during assembly into the cassette cover 10. The window 32 is not limited to polypropylene and can be chosen based on market value of raw materials. If a more rigid material is chosen, a texture could be added to the window to minimize skuffs (cosmetic defects) which may occur during the manufacturing process. The window can be transparent, translucent or opaque. Note that polypropylene is unlikely to show cosmetic defects due to its resilient properties. Also polypropylene is used because it is forgiving and will not crack or break if, e.g., the cassette is mailed.

Figure 2:
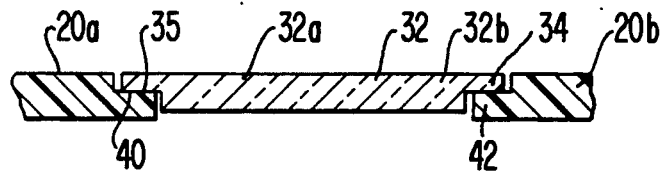
FIG. 2 is a side, cross-sectional view illustrating a window removably assembled in the cassette cover, taken along line 2—2 of FIG. 1.

As can be seen from FIG. 2, the borders 20a and 20b of the window opening 20 have reduced thickness portions 40 and 42, respectively, which abut the upper lips 35, 34 of the edges 32a, 32b of the window 32.

Figure 3:
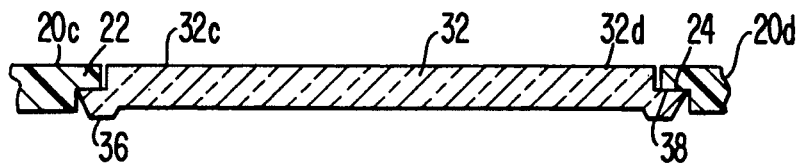
FIG. 3 is a side, cross-sectional view illustrating a window removably assembled in the cassette cover, taken along line 3—3 of FIG. 1.

As seen in FIG. 3, lower ledges 36, 38 of the edges 32c, 32d of the window 32 rest under reduced thickness portions 22, 24 of the sides 20c, 20d.

FIG. 1 also shows the method for removably assembling a window in a window opening. First, the planar window 30 is moved toward the window opening 18 and the window 30 is bowed or flexed so that the ledges 36, 38 fit under the reduced thickness portions 22, 24 of the border 18, and the lips 34, 35 come to rest on the reduced thickness portions 42, 40 of the border of the window opening 18. Accordingly, the window 30 is held in an assembled position via the cooperation of the members 34, 35, 40, 42, 36, 38, 22 and 24. This substantially rectangular window design allows insertion in either longitudinal direction.

Because of the snap-in feature of this invention, compatibility of window materials to the shell for welding purposes is no longer an issue. As a result, the window could be made of one material like polypropylene and the shell of another such as styrene. Also to reclaim all material in defective shells the window can be easily popped out. Further, the snap in window can be inserted from outside the cover before or after the cassette cover 10 and base are mated.

Figure 4:
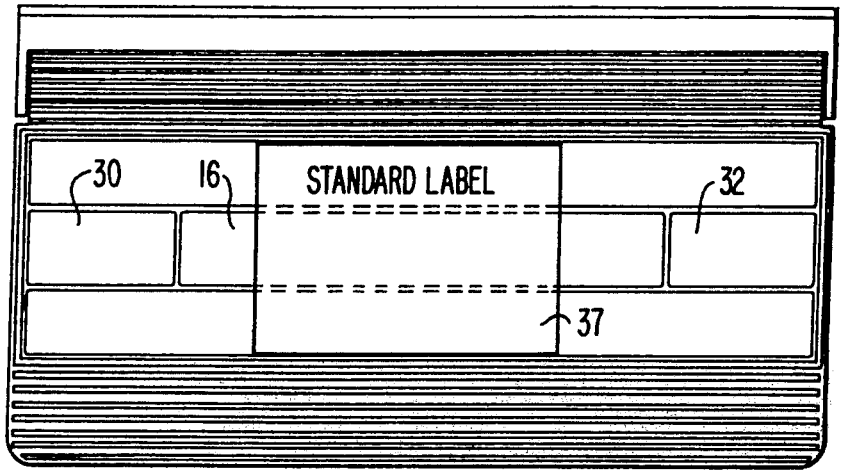
FIG. 4 is a top view of the tape cassette according to the first embodiment of the present invention, illustrating particularly a standard-sized label.
Figure 5:
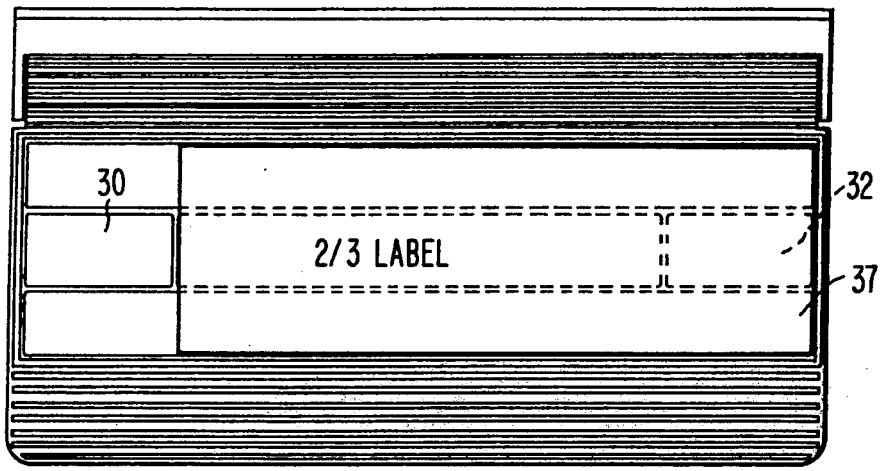
FIG. 5 is a top view of the tape cassette according to the present invention, illustrating particularly a label covering one window.
Figure 6:
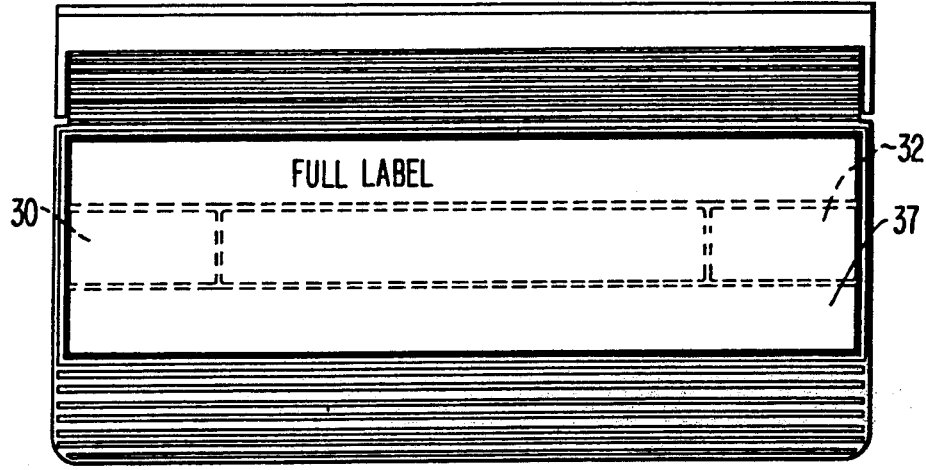
FIG. 6 is a top view of the tape cassette according to the present invention, illustrating particularly a label covering both windows.

Note also in FIGS. 2 and 3 that the label area 16 and windows 30, 32 are co-planar to allow for different label applications without changing the manufacturing process. For example, as shown in FIG. 4, a label 37 could be applied using, e.g., adhesive, to cover the central panel 16 only. In this way, the tape can still be seen through the windows, as is usual. As noted above, in certain circumstances there is no need to see the tape. Accordingly, one or both of the windows can be covered by the label, if desired, as shown in FIGS. 5 and 6, respectively. In this way, tape cassettes for repeat viewing and "one-time" viewing can be economically produced from the same mold and windows can be used for both versions, but the windows can be covered and used as valuable advertising space, for the one-time users.

The windows 30, 32, if desired, can be removed by reversing the above steps. More particularly, pressure is exerted on the window from the underside, whereupon the window flexes and the ledges 36, 38 are removed from underneath the reduced thickness portions 22, 24.

FIG. 7 is a top view of the video tape cassette according to a second embodiment of the present invention. The cassette is generally denominated by reference numeral 50 and includes a cover 52 and a base 54. The cover 52 includes a planar central panel or label area 56 which receives advertising, notices, etc. Laterally of the central panel 56 there is formed a pair of window openings 58 and 60, respectively. The window openings 58 and 60 include three straight sides 58a, 58b, 58c and 60a, 60b, 60c and an arched side, 58d, 60d, respectively.

Located within each window opening 58, 60, are windows 62 and 64. Because the configuration of each of the windows 62 and 64 is identical, a single window 62 will be described more fully hereafter.

As shown best in FIG. 9, window 62 is substantially square and planar and includes three corresponding straight sides 62a, 62b, 62c and a radius or arched side 62d. An upper lip 66 extends substantially around the upper portion of the window 62, being interrupted only above the ledges discussed below. That is, a lower ledge or ridge 68 is formed substantially centrally along side 62c and a lower ledge or ridge 70 is formed substantially centrally of the side 62d. The ledge 70 protrudes further outwardly than the ledge 68. As can be seen, the interruption in the upper lip 66 at the central portions of the sides 62c and 62d is about as wide as the lower ledges 68 and 70.

As can be seen from FIG. 8, the borders 58c and 58d of the window opening 58 have reduced thickness portions 74 and 72, respectively, which are received between the upper lip 66 and lower ledges 68, 70 of the window 62.

FIG. 8 also shows the method for assembling the window 62 removably in the window opening 58. First, the window 62 is moved in the direction of the window opening 58 and is flexed or bowed so that the lower ledges 68, 70 are fitted under the reduced thickness portions 74, 72 respectively, of the window opening 58, and the upper lip 66 abuts the top of the portions 72, 74. Accordingly, the window 62 is held in an assembled position via the cooperation of the members 66, 68, 70, 72 and 74.

Figure 10:
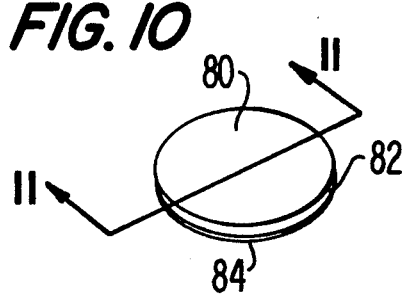
FIG. 10 is a perspective view of a third embodiment of a removable window according to the present invention.
Figure 11:
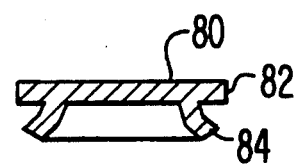
FIG. 11 is a side, cross sectional view taken along line 11—11 in FIG. 10.

FIGS. 10 and 11 illustrate a third embodiment of the invention, wherein the window 80 is circular and includes an upper lip 82 and a lower ledge 84. Again, the window 80 is inserted by flexing same and can be removed by flexing. Such a round snap-in window 80, unlike the second embodiment described above, requires no particular orientation in manufacturing.

In contrast to the conventional window/cassette cover combination, the present invention connects the window to the cassette cover without welding. As a result, there is no need for the expense associated with a welder or adjusting the welder for different plastic materials: the end product, therefore is of a more predictably repeatable nature. Further, without damaging the tape cassette when removing the window, it is easier to separate the different type plastic components of the tape cassette for recycling.

The final cost of producing/assembling the window is also decreased. Further, the likelihood of the window coming undone during assembly is eliminated. Finally, if a defect is found in either the window or the cassette cover, these members can be disassembled, the defective part re-cycled and the non-defective part reused. These features, of course, further lead to reducing the overall cost of the cassette.

As can be seen, a tape cassette made according to the present invention can be used by the consumer, returned, easily dismantled, reloaded with tape, and resold. Most particularly, the window can be easily removed and replaced if necessary, without damaging any parts of the tape cassette.

The foregoing is considered illustrative only of the principles of the invention. Further, since numerous modifications and changes will readily occur to those skilled in the art, it is not desired to limit the invention to the exact construction and operation shown and described. For example, the above-described tape cassette has been shown to be of the type intended for use in video tape players/recorders. However, the invention can be similarly applied to tape cassettes for use in audio or other playing/recording apparatus. Moreover, although the window is characterized as being removably attached to the cover, the window could be attached to a cassette base, if desired. Accordingly, all suitable modifications and equivalents may be resorted to that fall within the scope of the invention and the appended claims.

What is claimed is:

1. A tape cassette window/cover combination, comprising:
   (a) a cassette cover including two openings, each opening for receiving a window and each opening including a border;
   (b) two planar windows, each including sides; and
   (c) means for removably mounting each window relative to one of the openings of the cassette cover, said means including upper and lower projections formed on the window which removably receive therebetween the border.

2. A tape cassette window/cover combination, comprising:
   (a) a cassette cover including two openings, each opening for receiving a window and each opening including a border;
   (b) two planar rectangular windows, each including sides; and
   (c) means for removably mounting each window relative to one of the openings of the cassette cover,
   wherein said means includes a pair of upper lips, each on opposite sides of the window, a pair of lower ledges, ea h on other opposite sides of the window, and a reduced thickness portion on the border, and
   wherein the lips and ledges removably receive the reduced thickness portion of the border therebetween.

3. A tape cassette window/cover combination, comprising:

(a) a cassette cover including two openings, each opening for receiving a window and each opening including a border;
(b) two planar substantially square windows, each including sides; and
(c) means for removably mounting each window relative to one of the openings of the cassette cover,
wherein said means includes an upper lip extending substantially around the four sides of the square, a pair of lower ledges on two opposite sides of the square, and a reduced thickness portion on the border, and
wherein the lip and ledges removably receive the reduced thickness portion of the border therebetween.

4. A tape cassette window/cover combination, comprising:
(a) a cassette cover including two openings, each opening for receiving a window and each opening including a border;
(b) two planar circular windows; and
(c) means for removably mounting each window relative to one of the openings of the cassette cover, wherein said means includes an upper continuous lip, a lower ledge and a reduced thickness portion on the border, and
wherein the lip and ledge removably receives the reduced thickness portion of the border therebetween.

5. The combination recited in claims 1, 2, 3 or 4, further comprising:
(d) a planar label area formed on the cassette cover between the two window openings,
wherein the windows and the label area form a continuous planar upper surface on the cassette cover.

6. The combination as recited in claim 5, further comprising:
(e) a label covering the label area and completely covering one of the windows.

7. The combination as recited in claim 5, further comprising:
(e) a label covering the label area and completely covering both of the windows.

8. The combination as recited in claims 1, 2, 3 or 4, further comprising:
(e) a label covering the label area.

9. A tape cassette window/cover combination, comprising:
(a) a cassette half including an opening for receiving a window, said opening including a border;
(b) a planar window; and
(c) means for removably mounting the window relative to the opening of the cassette half, said means inclduing upper and lower projections formed on the window which removably receive therebetween the border.

* * * * *